(12) United States Patent
Frankel et al.

(10) Patent No.: US 9,948,387 B2
(45) Date of Patent: Apr. 17, 2018

(54) PATH COMPUTATION BASED ON DYNAMIC PERFORMANCE MONITORING SYSTEMS AND METHODS IN OPTICAL NETWORKS

(71) Applicant: Ciena Corporation, Hanover, MD (US)

(72) Inventors: Michael Y. Frankel, Baltimore, MD (US); Loudon T. Blair, Severna Park, MD (US); Christian Bourget, Stittsville (CA); Lyndon Y. Ong, Sunnyvale, CA (US); David Weldon Boertjes, Nepean (CA); Jamie Gaudette, Ottawa (CA)

(73) Assignee: Ciena Corporation, Hanover, MD (US)

(*) Notice: Subject to any disclaimer, the term of this patent is extended or adjusted under 35 U.S.C. 154(b) by 0 days.

(21) Appl. No.: 15/289,391

(22) Filed: Oct. 10, 2016

(65) Prior Publication Data
US 2017/0033865 A1 Feb. 2, 2017

Related U.S. Application Data

(63) Continuation of application No. 13/872,550, filed on Apr. 29, 2013, now Pat. No. 9,490,894, which is a
(Continued)

(51) Int. Cl.
*H04B 10/00* (2013.01)
*H04B 10/079* (2013.01)
(Continued)

(52) U.S. Cl.
CPC ....... *H04B 10/0795* (2013.01); *H04B 10/073* (2013.01); *H04B 10/0793* (2013.01);
(Continued)

(58) Field of Classification Search
USPC ............................. 398/9, 25–35, 58
See application file for complete search history.

(56) References Cited

U.S. PATENT DOCUMENTS

| 4,586,186 A | * | 4/1986 | Anderson | .......... | H04B 10/0771 |
| | | | | | 370/205 |
| 5,339,182 A | * | 8/1994 | Kimble | ................ | H04B 10/291 |
| | | | | | 398/158 |

(Continued)

OTHER PUBLICATIONS

F.N. Hauske, M. Kuscherov, K. Plyawanno, B. Spinnler, E. -D. Schmidt, B. Lankli "DGD Estimation from FIR Filter Taps in Presence of Higher Order PMD"; ECOC 2008, Sep. 21-25, 2008, Brussels, Belgium; vol. 2-39; IEEE (c)2008.

(Continued)

*Primary Examiner* — Agustin Bello
(74) *Attorney, Agent, or Firm* — Clements Bernard Walker PLLC; Christopher L. Bernard; Lawrence A. Baratta, Jr.

(57) ABSTRACT

The present disclosure provides dynamic performance monitoring systems and methods for optical networks to ascertain optical network health in a flexible and accurate manner. The present invention introduces accurate estimations for optical channel performance characteristics based either on existing channels or with a dynamic optical probe configured to measure characteristics on unequipped wavelengths. Advantageously, the dynamic performance monitoring systems and methods introduce the ability to determine physical layer viability in addition to logical layer viability.

20 Claims, 10 Drawing Sheets

Related U.S. Application Data continuation-in-part of application No. 12/623,711, filed on Nov. 23, 2009, now Pat. No. 8,433,192.

(60) Provisional application No. 61/120,649, filed on Dec. 8, 2008.

(51) Int. Cl.
  *H04J 14/02* (2006.01)
  *H04B 10/073* (2013.01)

(52) U.S. Cl.
  CPC ...... *H04J 14/0257* (2013.01); *H04J 14/0267* (2013.01); *H04J 14/0269* (2013.01); *H04J 14/0275* (2013.01); *H04J 14/0268* (2013.01)

(56) References Cited

U.S. PATENT DOCUMENTS

| | | | | |
|---|---|---|---|---|
| 5,450,394 A * | 9/1995 | Gruber | H04Q 11/0478 | 370/253 |
| 5,596,667 A * | 1/1997 | Watanabe | G02F 1/3538 | 372/21 |
| 5,764,626 A * | 6/1998 | VanDervort | H04J 3/14 | 370/232 |
| 5,859,716 A * | 1/1999 | O'Sullivan | H04B 10/0771 | 398/17 |
| 6,025,949 A * | 2/2000 | Anderson | H04B 10/0777 | 398/181 |
| 6,058,102 A * | 5/2000 | Drysdale | H04L 1/24 | 370/248 |
| 6,215,772 B1 * | 4/2001 | Verma | H04L 45/00 | 370/231 |
| 6,366,216 B1 * | 4/2002 | Olesen | G01S 13/765 | 340/10.1 |
| 6,441,933 B1 * | 8/2002 | Jang | H04B 10/077 | 398/79 |
| 6,765,659 B1 * | 7/2004 | Bhatnagar | G01M 11/338 | 356/73.1 |
| 6,765,670 B2 * | 7/2004 | Olsson | G02B 6/29302 | 356/303 |
| 6,871,021 B2 * | 3/2005 | Graves | H04Q 11/0005 | 398/16 |
| 6,882,798 B2 * | 4/2005 | Uematsu | H04J 14/0201 | 398/26 |
| 6,968,131 B2 * | 11/2005 | Obeda | H04B 10/0773 | 398/25 |
| 7,031,606 B2 * | 4/2006 | Liu | H04B 10/00 | 398/13 |
| 7,113,706 B2 * | 9/2006 | Feinberg | H04B 10/077 | 398/1 |
| 7,133,135 B2 * | 11/2006 | Dorrer | G01J 9/02 | 356/450 |
| 7,142,783 B2 * | 11/2006 | Obeda | H04B 10/00 | 398/32 |
| 7,149,433 B2 * | 12/2006 | Grubb | H04B 10/291 | 398/175 |
| 7,174,108 B2 * | 2/2007 | Kamura | H04B 10/0777 | 359/337 |
| 7,184,660 B2 * | 2/2007 | Liu | H04B 10/00 | 398/13 |
| 7,269,356 B2 * | 9/2007 | Winzer | H04B 10/60 | 398/135 |
| 7,283,744 B2 * | 10/2007 | Dinu | H04B 10/0795 | 398/147 |
| 7,298,489 B2 * | 11/2007 | Dorrer | G01J 11/00 | 356/450 |
| 7,356,256 B1 * | 4/2008 | Strawczynski | H04B 10/077 | 398/189 |
| 7,430,372 B2 * | 9/2008 | Suematsu | H04B 10/25133 | 398/31 |
| 7,469,104 B2 * | 12/2008 | Neubelt | H04B 10/035 | 398/10 |
| 7,496,296 B2 * | 2/2009 | Michishita | H04B 10/071 | 398/147 |
| 7,522,842 B1 * | 4/2009 | McNicol | H04B 10/2916 | 398/157 |
| 7,532,818 B2 * | 5/2009 | Hsu | H04B 10/07953 | 398/16 |
| 7,535,923 B2 * | 5/2009 | Ward | H04L 43/00 | 370/378 |
| 7,536,111 B1 * | 5/2009 | An | H04B 10/505 | 398/183 |
| 7,558,479 B1 * | 7/2009 | Robinson | H04B 10/0795 | 398/13 |
| 7,680,412 B2 * | 3/2010 | Anderson | H04B 10/07955 | 398/177 |
| 7,684,696 B1 * | 3/2010 | Hadden | H04B 10/07 | 398/25 |
| 7,715,710 B2 * | 5/2010 | Wan | H04B 10/0775 | 385/24 |
| 7,756,421 B2 * | 7/2010 | Roberts | H04B 10/2543 | 398/158 |
| 7,783,193 B2 * | 8/2010 | Remedios | H04B 10/07 | 398/15 |
| 7,809,279 B2 * | 10/2010 | Zhang | H04B 10/035 | 356/73.1 |
| 7,869,708 B2 * | 1/2011 | Evangelides, Jr. | H04B 10/0771 | 398/151 |
| 8,014,668 B2 * | 9/2011 | Wan | H04B 10/0775 | 398/147 |
| 8,045,862 B2 * | 10/2011 | Liu | H04B 10/291 | 398/160 |
| 8,102,774 B2 * | 1/2012 | Gero | H04L 43/0811 | 370/236.2 |
| 8,116,625 B2 * | 2/2012 | Ito | H04B 10/0775 | 398/25 |
| 8,131,149 B2 * | 3/2012 | Zottmann | H04J 14/0204 | 398/45 |
| 8,135,275 B2 * | 3/2012 | Heismann | G01M 11/333 | 398/16 |
| 8,285,148 B2 * | 10/2012 | Haunstein | H04B 10/60 | 398/158 |
| 8,433,192 B2 * | 4/2013 | Frankel | H04B 10/0795 | 398/16 |
| 8,441,937 B2 * | 5/2013 | Gero | H04L 43/0811 | 370/236.2 |
| 8,554,074 B2 * | 10/2013 | Boertjes | H04J 14/0204 | 398/45 |
| 8,655,185 B2 * | 2/2014 | Sakamoto | H04B 10/0775 | 398/147 |
| 2002/0012142 A1 * | 1/2002 | Gautheron | H04B 10/0731 | 398/79 |
| 2002/0044314 A1 * | 4/2002 | Michishita | H04B 10/071 | 398/3 |
| 2002/0044322 A1 * | 4/2002 | Blumenthal | H04B 10/00 | 398/147 |
| 2002/0054408 A1 * | 5/2002 | Lee | G01D 5/35383 | 398/99 |
| 2002/0109879 A1 * | 8/2002 | Wing So | H04J 7/00 | 398/58 |
| 2002/0126337 A1 * | 9/2002 | Uematsu | H04J 14/0201 | 398/27 |
| 2003/0081295 A1 * | 5/2003 | Kamura | H04B 10/0777 | 398/181 |
| 2003/0138250 A1 * | 7/2003 | Glynn | G01J 1/4257 | 398/34 |
| 2003/0180042 A1 * | 9/2003 | Nelles | H04B 10/07 | 398/27 |
| 2004/0047629 A1 * | 3/2004 | Evangelides, Jr. | H04B 10/071 | 398/33 |
| 2004/0208503 A1 * | 10/2004 | Shieh | H04B 10/071 | 398/13 |
| 2004/0213338 A1 * | 10/2004 | Strawczynski | H04B 10/077 | 375/224 |
| 2005/0013610 A1 * | 1/2005 | Evangelides, Jr. | H04B 10/6971 | 398/33 |
| 2005/0095006 A1 * | 5/2005 | Evangelides, Jr. | H04B 10/0795 | 398/158 |

(56) References Cited

U.S. PATENT DOCUMENTS

| | | | | |
|---|---|---|---|---|
| 2005/0099949 A1* | 5/2005 | Mohan | ............... | H04L 47/10 370/236.2 |
| 2005/0196167 A1* | 9/2005 | Nagel | ............... | H04B 10/071 398/37 |
| 2005/0196174 A1* | 9/2005 | Evangelides, Jr. | ............... | H04B 10/0771 398/151 |
| 2005/0196175 A1* | 9/2005 | Evangelides, Jr. | ............... | H04B 10/0771 398/151 |
| 2005/0232631 A1* | 10/2005 | Look | ............... | H04B 10/07951 398/58 |
| 2005/0244154 A1* | 11/2005 | Dinu | ............... | H04B 10/0795 398/33 |
| 2006/0129939 A1* | 6/2006 | Nelles | ............... | H04B 10/07 715/736 |
| 2006/0159464 A1* | 7/2006 | Cornwell | ............... | H04B 10/071 398/169 |
| 2006/0188262 A1* | 8/2006 | Suematsu | ............... | H04B 10/077 398/147 |
| 2006/0251423 A1* | 11/2006 | Evangelides, Jr. | | H04B 10/2935 398/105 |
| 2006/0285501 A1* | 12/2006 | Damm | ............... | H04L 41/142 370/252 |
| 2007/0154214 A1* | 7/2007 | Hsu | ............... | H04B 10/07953 398/27 |
| 2007/0154219 A1* | 7/2007 | Feinberg | ............... | H04J 14/0227 398/104 |
| 2008/0050120 A1* | 2/2008 | Neubelt | ............... | H04B 10/035 398/104 |
| 2008/0205886 A1* | 8/2008 | Anderson | ............... | H04B 10/07955 398/26 |
| 2009/0208205 A1* | 8/2009 | Eliyahu | ............... | H04B 10/61 398/25 |
| 2009/0214201 A1* | 8/2009 | Oda | ............... | H04B 10/0795 398/25 |
| 2009/0324249 A1* | 12/2009 | Zhang | ............... | H04B 10/071 398/177 |
| 2010/0021163 A1* | 1/2010 | Shieh | ............... | H04B 10/60 398/65 |
| 2010/0092178 A1* | 4/2010 | Liu | ............... | H04B 10/0771 398/105 |
| 2010/0142943 A1* | 6/2010 | Frankel | ............... | H04B 10/0795 398/25 |
| 2010/0226644 A1* | 9/2010 | Ito | ............... | H04B 10/0775 398/25 |
| 2010/0290345 A1* | 11/2010 | Gero | ............... | H04L 43/0811 370/241.1 |
| 2011/0026925 A1* | 2/2011 | Mu | ............... | H04J 14/0257 398/79 |
| 2011/0110660 A1* | 5/2011 | Taylor | ............... | H04J 14/02 398/34 |
| 2011/0216772 A1* | 9/2011 | Mohan | ............... | H04L 12/4633 370/392 |
| 2011/0229128 A1* | 9/2011 | Sakamoto | ............... | H04B 10/0775 398/29 |
| 2012/0120809 A1* | 5/2012 | Gero | ............... | H04L 43/0811 370/241.1 |
| 2012/0183294 A1* | 7/2012 | Boertjes | ............... | H04J 14/0204 398/49 |
| 2013/0236169 A1* | 9/2013 | Gaudette | ............... | H04B 10/0793 398/25 |
| 2017/0033865 A1* | 2/2017 | Frankel | ............... | H04B 10/0793 |

OTHER PUBLICATIONS

William Shich, Rodney S. Tucker, Wei Chen, Singwen Yi, and Graema Pendock; Optical Performance Monitoring in Coherent Optical OFDM Systems; Received Nov. 6, 2006; revised Dec. 25, 2006; accepted Dec. 26, 2006; vol. 15, No. 2/Optics Express 35; ARC Special Research Centre for Ultra-Broadband Information Networks . . . The University of Melbourne, Melbourne, VIC, Australia.

F.N. Hauske, J.C. Geyer, M Kuscherov, K. Plyawanno, T. Duthel, C.R.S. Fludger, D. Van Den Borne, E.-D. Schmidt, B. Spinnler, H. De Waadt, B. Lankl; Optical Performance Monitoring from FIR Filter Coefficients in Coherent Receivers; (c)2008 Optical Society of America.

* cited by examiner

PATH COMPUTATION BASED ON DYNAMIC PERFORMANCE MONITORING SYSTEMS AND METHODS IN OPTICAL NETWORKS

CROSS-REFERENCE TO RELATED APPLICATION

The present non-provisional patent application/patent is a continuation of U.S. patent application Ser. No. 13/872,550, filed on Apr. 29, 2013, and entitled "COHERENT PROBE AND OPTICAL SERVICE CAHNNEL SYSTEMS AND METHODS FOR OPTICAL NETWORKS," which is a continuation-in-part of U.S. patent application Ser. No. 12/623,711, filed on Nov. 23, 2009, and entitled "DYNAMIC PERFORMANCE MONITORING SYSTEMS AND METHODS FOR OPTICAL NETWORKS" which claims the benefit of priority of U.S. Provisional Patent Application No. 61/120,649, filed on Dec. 8, 2008, and entitled "DYNAMIC PERFORMANCE MONITORING SYSTEMS AND METHODS FOR OPTICAL NETWORKS," the contents of each are incorporated in full by reference herein.

FIELD OF THE INVENTION

The present invention relates generally to optical networks and systems and methods for monitoring and assessing the performance of the same. More particularly, the present invention provides dynamic performance monitoring systems and methods for optical networks that allow optical network health to be ascertained in a flexible and accurate manner. The configuration and performance of the optical networks may then be adjusted accordingly to achieve desired characteristics and/or performance goals. Thus, the present invention provides valuable diagnostic tools.

BACKGROUND OF THE INVENTION

Optical (i.e., transport) networks and the like (e.g., wavelength division multiplexing (WDM), Synchronous Optical Network (SONET), Synchronous Digital Hierarchy (SDH), Optical Transport Network (OTN), Ethernet, and the like) at various layers are deploying control plane systems and methods. Control plane systems and methods provide automatic allocation of network resources in an end-to-end manner. Exemplary control planes may include Automatically Switched Optical Network (ASON) as defined in G.8080/Y.1304, Architecture for the automatically switched optical network (ASON) (February/2005), the contents of which are herein incorporated by reference; Generalized Multi-Protocol Label Switching (GMPLS) Architecture as defined in Request for Comments (RFC): 3945 (October/2004) and the like, the contents of which are herein incorporated by reference; Optical Signaling and Routing Protocol (OSRP) from Ciena Corporation which is an optical signaling and routing protocol similar to PNNI (Private Network-to-Network Interface) and MPLS; or any other type control plane for controlling network elements at multiple layers, and establishing connections there between.

The GMPLS, ASON, etc. standards are driving increasing levels of dynamic optical network reconfigurability. Optical signal propagation is an inherently analog process, and monitoring analog network performance is critical to dynamic reconfigurability. Both optical network design and reconfiguration require the use of optical path computation software that computes expected signal performance based on specific network physical characteristics. An example of such path computation software is the Path Computation Element (PCE) currently under consideration in the IETF. These must still be validated against field measurements, as there are large uncertainties in the optical fiber and installed equipment as well as possible aging errors. Networks may have wavelengths with several technology generations supporting a variety of data rates, modulation formats, and the like.

The current state of the art in deployed networks is limited to three types of measurements. First, existing channels provide a measure of both pre-corrected and post-corrected Forward Error Correction (FEC) error counts. These are only available for specific lightpaths, where channels with embedded FEC are already installed and operational. Further, pre-FEC bit error rate (BER) is only accurate at high values. At lower values of BER, the counts only provide an upper bound measurement due to the presence of dynamic control algorithms, which stop working once a specific bound is reached. Finally, no information is provided that can be used to predict the performance of channels with a different bit rate and modulation format.

Second, channel power levels are available at various points in the system, either as an aggregate total or for individual channels as at Optical Channel Monitor (OCM) points. These provide some indication of the overall system health, but can say very little about specific channel performance or about path suitability for additional channels. Third, some recent monitors have added Optical Signal-to-Noise Ratio (OSNR) measurement capability, which provides an indication of one of more major optical signal impairment mechanisms.

While some signal quality measurement approaches exist, they do not provide sufficient information to accurately estimate new channel performance, or to validate the accuracy of the path computation calculation. What is missing is ability to extract the following:

More accurate OSNR measurement;
Estimation for residual Chromatic Dispersion;
Estimation for Polarization Dependent Loss;
Estimation for Polarization Mode Dispersion;
Estimation for inter-channel nonlinear effects, such as Cross-Phase Modulation (XPM) and Four Wave Mixing (FWM);
Estimation for intra-channel nonlinear effects, such as Self-Phase Modulation (SPM), iXPM, iFWM; and
Estimation for possible bandwidth narrowing due to in-line optical filtering (for example, Optical Add-Drop Module (OADM) filters).

With respect to Optical Service Channels (OSCs), conventional OSCs use fixed wavelength intensity modulated direct detection (IMDD) transponders in an out-of-band wavelength. Feedback on performance data in conventional systems use coherent transponders to glean some link performance information on a path-by-path basis; however, the majority of link characterization is done before the system gets deployed. Conventional optical service channels offer only limited line characterization with the main purpose providing communication between network components.

As described herein, link characterization in conventional systems includes major cost and complexity in designing and deploying optical networks. The process of producing link budgets (optical performance) involves collecting data on the network, and propagation simulation. This is a lengthy, expensive, time consuming process. The main limitation of this process is that data is only gathered once in the lifetime of the system—before it is even deployed. Normally, since OSC's have been traditionally IMDD receivers, there is the need to filter the output of each span so that only the OSC wavelength range is present on the OSC receiver. Since this is the case, it is normally the practice to use an out of band wavelength which is not amplified by the EDFAs in the system. This saves bandwidth for data-bearing traffic, but limits the usefulness of the OSC measurements since it cannot measure the ASE generated by the amplifiers themselves. Therefore, conventional OSCs offer some direct characterization which is limited to loss, latency and with a coarse precision, chromatic dispersion.

Other characteristics of the line system must be calculated indirectly from these measurements and the one-time, start-of-life fiber characterization data using detailed knowledge of the system design, for example, the noise figure of the amplifiers, user knowledge of the fiber type, etc. Active feedback on performance data in current systems has been suggested using coherent transponders to glean some link performance information. However, this information is available only for in-service light paths, making it difficult or impossible to locate the source of any particular effect or degradation within those paths, and results in a complete lack of information on paths which are not currently in use.

BRIEF SUMMARY OF THE INVENTION

In an exemplary embodiment, an optical system includes a coherent optical transmitter; a coherent optical receiver; and a digital processing block connected to the coherent optical transmitter and the coherent optical receiver, wherein the digital processing block selectively operates the coherent optical transmitter and the coherent optical receiver as one of an optical probe and an optical service channel. The coherent optical receiver can be configured to tune to one of a plurality of wavelengths, and, when operating as the optical probe, the digital processing block determines optical channel performance characteristics of the one of the plurality of wavelengths. The optical channel performance characteristics can include any of OSNR measurement, residual Chromatic Dispersion, Polarization Dependent Loss, Polarization Mode Dispersion, inter-channel nonlinear effects, intra-channel nonlinear effects, cross-phase modulation, and bandwidth narrowing. The digital processing block can provide the optical channel performance characteristics to an optical control plane for inclusion in an optical path computation function associated with the optical control plane. The coherent optical transmitter can be configured to tune to an optical service channel wavelength outside an amplification band, and, when operating as the optical service channel, the digital processing block interfaces with the coherent optical transmitter and the coherent optical receive for data transmission.

The data transmission can utilize a low data rate and robust modulation format such as a dual-polarization binary phase-shift keying modulation format. The optical system can further include a first optical device connected to the coherent optical receiver and a downstream optical fiber, wherein the first optical coupler is configured to provide an upstream signal to the coherent optical receiver; and a second optical device connected to the coherent optical transmitter and an upstream optical fiber, wherein the second optical coupler is configured to provide a downstream signal from the coherent optical receiver. The first optical device and the second optical device each can include a four port coupler including a common in port, a common out port, an OSC add port, and an OSC bypass port. The coherent optical transmitter and the coherent optical receiver can utilize oversampling of a heterodyne intermediate frequency (IF) with adaptive digital filtering.

In another exemplary embodiment, an optical network includes a plurality of nodes interconnected through a plurality of links; a control plane communicatively coupled to each of the plurality of nodes; and a coherent optical system between each of the plurality of nodes selectively operating as one of an optical probe and an optical service channel therebetween; wherein the control plane includes an optical path computation function configured to provide estimation of optical channel performance characteristics based on measurements by the optical probe. The coherent optical system can include a coherent optical transmitter; a coherent optical receiver; and a digital processing block connected to the coherent optical transmitter and the coherent optical receiver, wherein the digital processing block selectively operates the coherent optical transmitter and the coherent optical receiver as one of the optical probe and the optical service channel. The coherent optical transmitter can be configured to tune to one of a plurality of wavelengths, and, when operating as the optical probe, the digital processing block determines optical channel performance characteristics of the one of the plurality of wavelengths. The optical channel performance characteristics can include any of OSNR measurement, residual Chromatic Dispersion, Polarization Dependent Loss, Polarization Mode Dispersion, inter-channel nonlinear effects, intra-channel nonlinear effects, cross-phase modulation, and bandwidth narrowing.

The digital processing block can provide the optical channel performance characteristics to an optical control plane for inclusion in an optical path computation function associated with the optical control plane. The coherent optical transmitter can be configured to tune to an optical service channel wavelength outside an amplification band, and, when operating as the optical service channel, the digital processing block interfaces with the coherent optical transmitter and the coherent optical receive for data transmission. The data transmission can utilize a low data rate and robust modulation format such as a dual-polarization binary phase-shift keying modulation format. The coherent optical system can further include a first optical device connected to the coherent optical receiver and a downstream optical fiber, wherein the first optical coupler is configured to provide an upstream signal to the coherent optical receiver; and a second optical device connected to the coherent optical transmitter and an upstream optical fiber, wherein the second optical coupler is configured to provide a downstream signal from the coherent optical receiver. The first optical device and the second optical device each can include a four port coupler including a common in port, a common out port, an OSC add port, and an OSC bypass port. The coherent optical transmitter and the coherent optical receiver can utilize oversampling of a heterodyne intermediate frequency (IF) with adaptive digital filtering.

In yet another exemplary embodiment, a method includes operating a coherent optical probe between a first node and a second node; tuning the coherent optical probe to one of a plurality of wavelengths; measuring optical channel performance characteristics of the one of the plurality of wavelengths utilizing a digital processing block at the second node; subsequent to the measuring, tuning the coherent optical probe to an optical service channel wavelength; and operating the coherent optical probe as an optical service channel between the first node and the second node.

BRIEF DESCRIPTION OF THE DRAWINGS

The present invention is illustrated and described herein with reference to the various drawings, in which like reference numbers are used to denote like system components/ method steps, as appropriate, and in which.

DETAILED DESCRIPTION OF THE INVENTION

Figure 1:
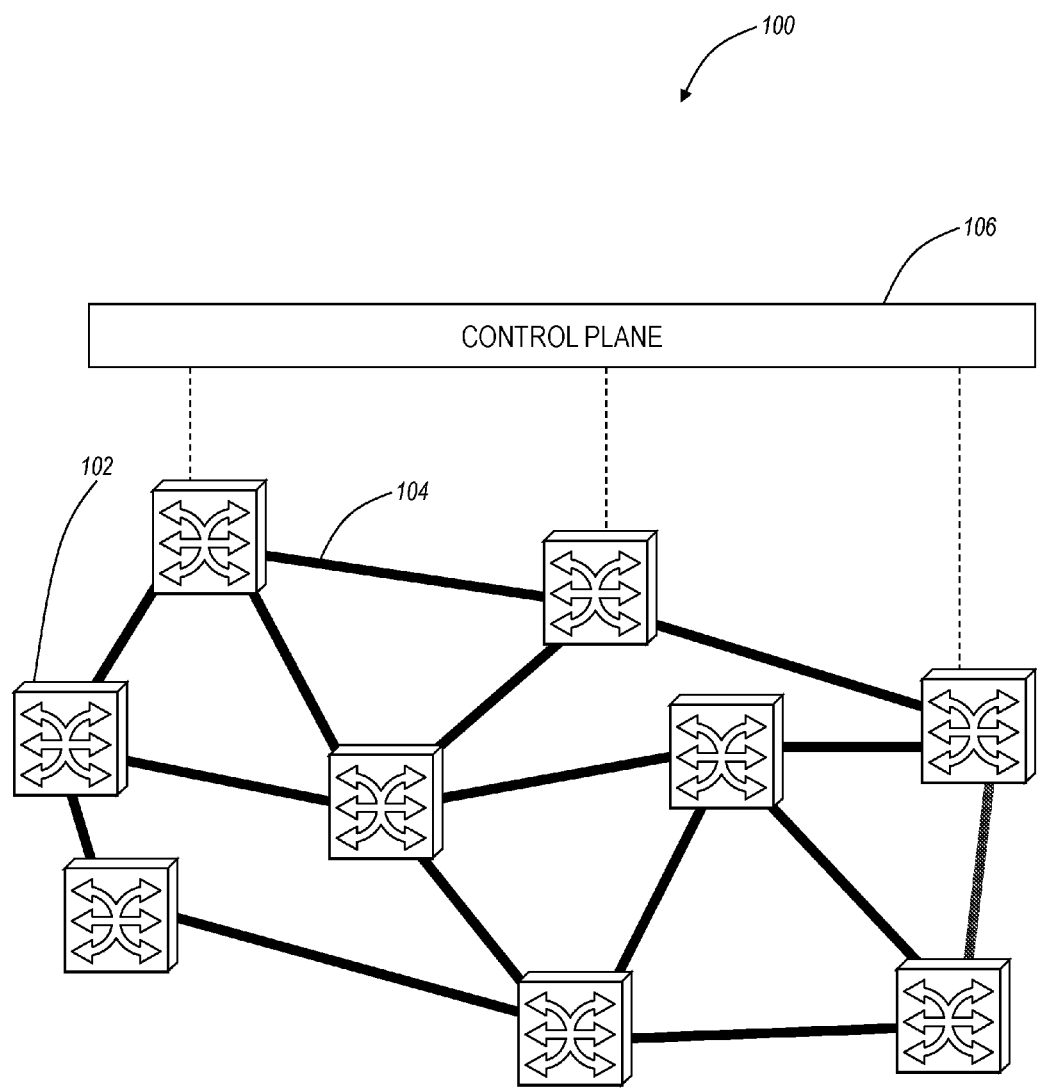
FIG. 1 is a schematic diagram and illustrates an optical network including a plurality of interconnected nodes according to an exemplary embodiment of the present invention.

In various exemplary embodiments, the present invention provides dynamic performance monitoring systems and methods for optical networks that allow optical network health to be ascertained in a flexible and accurate manner. The present invention introduces accurate estimations for optical channel performance characteristics based either on existing channels or with a dynamic optical probe configured to measure characteristics on unequipped wavelengths. Advantageously, the dynamic performance monitoring systems and methods introduce the ability to determine physical layer viability in addition to logical layer viability. The present invention provides span-by-span or section-by-section optical characterization of and nodal communications within a terrestrial or submarine fiber optical transmission system over the life of the system.

The present invention includes an optical probe element positioned at various points throughout the optical network. The optical probe includes a transmitter and receiver portion. The transmitter portion of the probe produces an optical pulse train modulated with PRB S data, and with a tunable wavelength and duty cycle and repetition rates selectable to represent signals of interest, i.e. 10 G, 20 G, 40 G, 100 G, etc. signals. The receiver portion of the probe uses asynchronous sampling to acquire signal diagrams. A Digital Signal Processor (DSP) analyzes acquired signals as a function of optical power, data rate, and tuned sampling timing, and provides a separable measurement of ASE, SPM, Filter narrowing, Chromatic Dispersion, and Polarization Mode dispersion (PMD) distortions. The measurements are cross-correlated to the propagation computations, which account for exact characteristics of data carrying wavelengths.

The optical probes can be deployed at all places where traffic demands originate/terminate or at a subset of such traffic endpoints. Under operator or automated control, these optical probes could be exercised to validate unused light paths across the network, in effect certifying these as usable by routing policies, either control plane based or operator/manually instigated. This can be a powerful aid in assuring that lightpaths can be established, or restored, with high confidence, particularly by control plane mechanisms.

Under automated control, the probes could be used, for example, during off-peak hours, to systematically validate the performance of potential lightpaths between points in the network and to build a database of lightpaths supporting a desired quality of service for future path provisioning or restoration. Note that the probes can be used in conjunction with existing optical transceivers. The existing optical transceivers can also provide optical parameters on the various fiber links over which they are provisioned.

In another exemplary embodiment, the present invention includes an optical service channel (OSC) including a low-cost coherent optical module which is specifically designed for span-by-span optical characterization in addition to the communications normally associated with OSCs. The coherent OSC can operate similar to the optical probes with additional functionality as an OSC while concurrently providing system-level algorithms to extract measurements and important performance data from the system both while it is being installed and over the life of the system.

Advantageously, the present invention can provide a significant reduction in time to provide link budgets, reduction in cost and test time for link budget model development, optical characterization over the life of the network, and the like. With this information, optical network can suggest modem, optical performance, and maximum capacity. The owner of the optical network can purchase plug and play components without the need for propagation simulation. The present invention includes advanced network performance monitoring, including PMD, CD, PDL, Latency; an inexpensive, low bit rate implementation; and support on very difficult networks.

Referring to FIG. 1, an optical network 100 with a plurality of interconnected nodes 102 is illustrated according to an exemplary embodiment of the present invention. Each of the interconnected nodes 102 can include a wave division multiplexing (WDM) terminal, a Reconfigurable OADM (ROADM), a Wavelength Selective Switch (WSS), an optical switch, a router, a data switch, a SONET/SDH platform, or the like. The interconnected nodes 102 are connected through a plurality of connections 104, which include optical fiber carrying one or more wavelengths between adjacent nodes 102.

The optical network 100 can further include a control plane 106. For example, the control plane can include Optical Signaling and Routing Protocol (OSRP), Automatically Switched Optical Networks (ASON), Generalized Multi-Protocol Label Switching (G-MPLS), and the like. The control plane 106 introduces intelligence in an optical transport system. It can perform many functions such as automatic resource discovery, distributing network resource information, establishing and restoring connections dynamically across the network, and the like. Accordingly, the control plane 106 is introducing layer two/three functionality in the optical network 100, i.e. the photonic layer, i.e. to communicate control plane information across a signaling communication network.

Of note, the role of Path Computation at the photonic layer is central to the lightpath routing calculation required to set up either primary or backup (protection/restoration) connections. Until recently, the WDM-based photonic layer has been used to provide static physical layer connectivity in carriers' networks and has typically been exempt from the requirement to reconfigure and respond to changes in traffic patterns. In carriers' networks, network reconfiguration is performed at the higher layers that are clients to the optical layer and provisioning of the optical layer is usually accomplished by a manually intensive process of segment-by-segment interconnection, requiring coordination between the carrier's various network management, operations, and inventory systems.

With the need to cope with the uncertainty of fast-changing data traffic (and consequently reduce operational expenses), carriers have been redesigning their operations support systems over recent years to automate network management and speed up their provisioning processes. This has been further supported by the introduction of advanced signaling and routing protocols that automate key administration and management functions and help the carrier to establish and tear down these connections in a rapid manner, i.e. the control plane 106.

With the emergence of next-generation reconfigurable optical add-drop multiplexers (ROADMs) and all-optical wavelength selective switches (WSSs), carriers are starting to demand that the same level of automation and connection provisioning capabilities currently available with SONET/SDH, ATM, MPLS, etc. also be provided at the all-optical (photonic) layer.

The present invention enables the control plane 106 to include additional constraints related to the physical transmission properties of the fiber plant, amplifiers, transceivers, and other optical network elements before determining the validity of a lightpath connection through the network 100. For illustration purposes, the optical network 100 shows only the nodes 102, but those of ordinary skill in the art will recognize that intermediate amplifiers and the like are typically included. Advantageously, the additional constraints enable the network 100 to determine if a new lightpath connection satisfies the dual constraints of physical and logical viability.

Some path computation work has started within the IETF on the Path Computation Element (PCE) but this has primarily focused on the problem of routing connections across multiple separate Interior-NNI domains.

Figure 2:
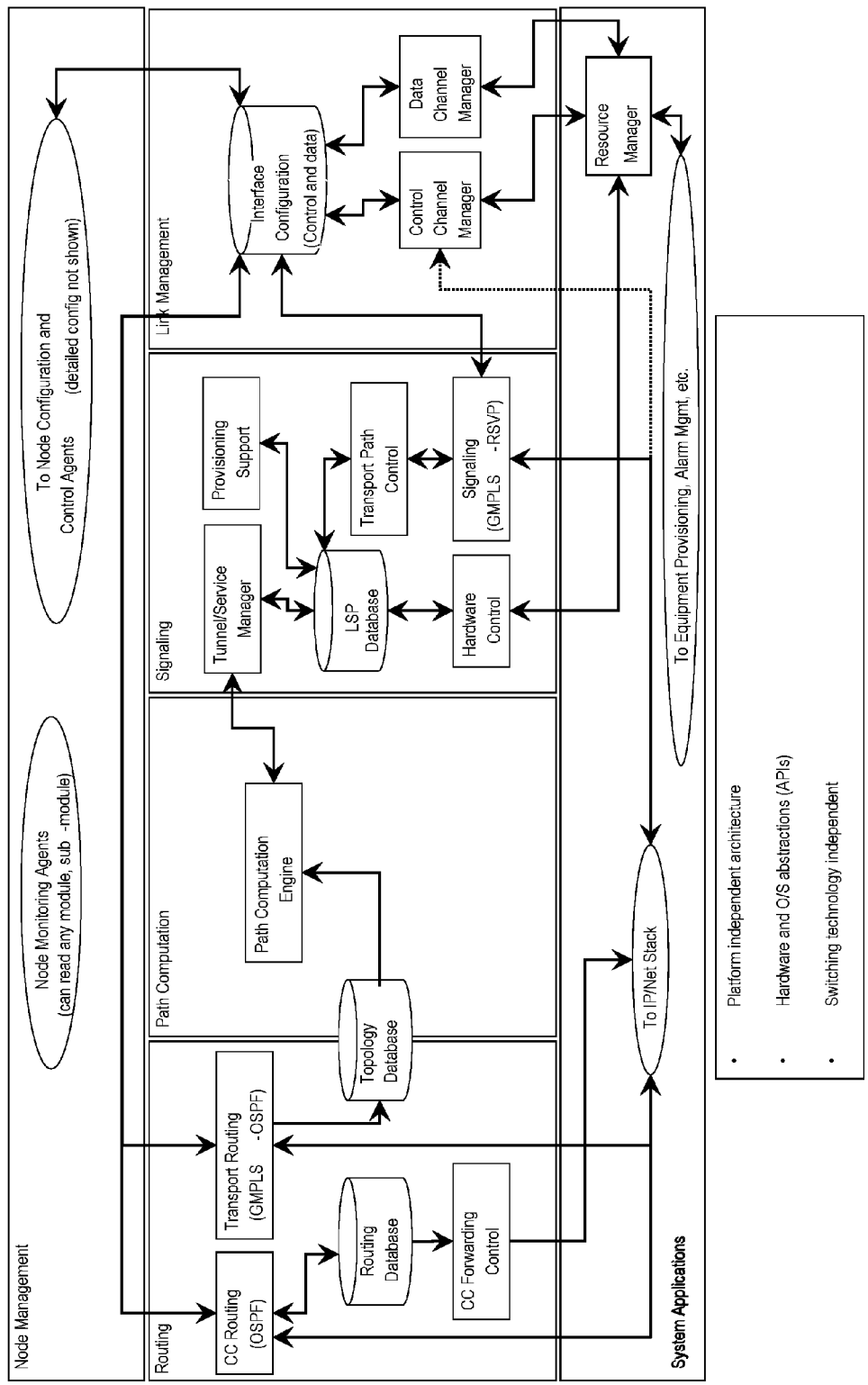
FIG. 2 is a schematic diagram and illustrates different types of software modules associated with an optical control plane according to an exemplary embodiment of the present invention.

Referring to FIG. 2, an illustration of the different types of software modules associated with an optical control plane 106 (FIG. 1) is illustrated according to an exemplary embodiment of the present invention. Central to this architecture is an online Path Computation function. This function implements a distributed path computation algorithm and provides path selection and next hop resolution based on information contained in the topology database.

The transaction time to setup a connection using distributed control plane signaling with distributed path computation is approximately equal to about one round trip time, plus the sum of "per-node" processing times. At each node, the dominant amount of processing time is due to path computation. When considering the physical limitations of optical propagation, this computation time can seriously degrade the time to set up or restore an optical lightpath.

By using offline pre-computation, the online path computation function can be replaced with a path "selection" function. This change is expected to save 10s to 100s of milliseconds per transaction and is a critical enabler for very fast service establishment and fast service restoration. Pre-computed routes will be periodically recomputed to accommodate changes in network resource availability, and to raise the probability that a pre-computed path can be successfully established when needed.

Figure 3:
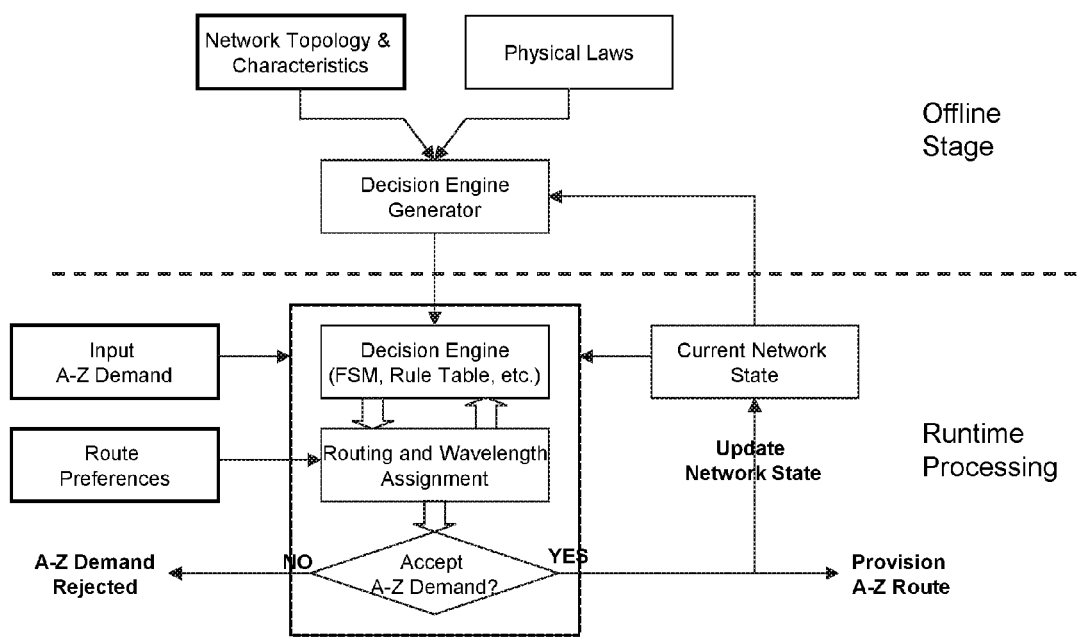
FIG. 3 is a flow diagram and illustrates a hybrid path computation capability that includes a centralized (offline) network planning tool at the network management layer and distributed (online) path computation engines at each network element for use by the control plane according to an exemplary embodiment of the present invention.

Referring to FIG. 3, a hybrid path computation capability that includes a centralized (offline) network planning tool at the network management layer and distributed (online) path computation engines at each network element for use by the control plane 106 (FIG. 1) is illustrated according to an exemplary embodiment of the present invention. The offline pre-computation has the benefit of being able to optimize based on a broad set of information, and being able to pre-compute paths across multiple network elements. The function of the centralized network planning tool is to pre-compute the validity of lightpaths to each destination from each location. Input parameters to the network planning tool are derived automatically where possible from the network via control plane discovery and routing. A database of valid, reachable destinations from each source is pre-computed and then disseminated to each node to be used in a distributed route calculation.

FIG. 3 illustrates an example flowchart view of an automated connection setup procedure within an all-optical signaling and routing framework. There are two stages in this procedure; (i) offline stage and (ii) online (runtime) stage.

The offline (or pre-processing) stage is separated from the network element and may be located within the network management sub-system, for example. The network topology, its components' characteristics and the current network state are used along with the physical models to generate a decision engine. The decision engine is defined as the time-varying construct that is used during the runtime processing stage to readily obtain the physical validity of the set of expected traffic connections in the network.

The online (or runtime processing) stage is located within the control plane sub-system with access to the distributed control plane routing protocol. It uses the results of the decision engine generator in combination with routing and wavelength assignment algorithms and the carrier's route preferences to determine the set of valid paths among which it selects the best path to satisfy the traffic demand. A key factor in determining the physical validity is the use of the current network state by the decision engine.

There are multiple ways to implement the decision engine either as a finite state machine, rule-based database or as a time-varying set of matrix constructs. This offline procedure can be designed to run periodically based on the changes in network traffic or it can be triggered by a change in the topology (such as the addition of a new link) or change in network characteristics (such as an amplifier controller that increases the amplifier gain to increase the supported set of wavelengths). Of course, the network characteristics can also be changed dynamically based on the feedback from the runtime processing stage. Although the framework will not preclude such feedback, these mechanisms are part of the physics realm and are beyond the scope of this document.

Figure 4:
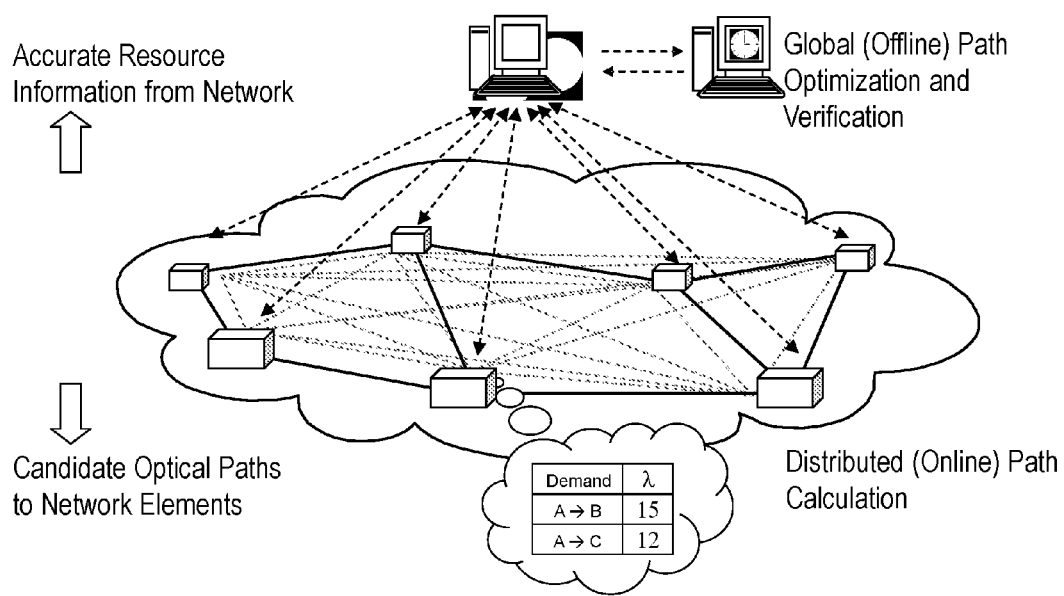
FIG. 4 is a schematic diagram and illustrates a hybrid path computation mechanism in an optical network according to an exemplary embodiment of the present invention.

Referring to FIG. 4, a hybrid path computation mechanism is illustrated in an optical network according to an exemplary embodiment of the present invention.

The traffic engineering (TE) database associated with the centralized (offline) network planning tool receives all routing updates distributed by the control plane. Thus, the centralized TE database is a mirror of the distributed databases located on each network element and therefore holds an accurate representation of the network state. Periodically, the centralized (offline) network planning tool calculates the top candidate optical paths from each node to each other node based on the latest 'snapshot' of network resource usage. Once calculated, this route information is disseminated to each of the distributed network elements in the form of a lookup table for use by the distributed (online) path computation (path selection) function. The online path computation then becomes a process of:

1. find least cost available path from source to destination from the lookup table; and
2. if there is no such path, look at 2 hop paths with regenerator in between.

Clearly, there are a number of issues that remain to be solved. The frequency of path calculation and information dissemination remains to be determined, as does the number of candidate paths from each node to each other node. The reach performance of each path will vary depending on the characteristics of the optical source (such as bitrate, type of FEC, etc). And, such issues will impact the size and scalability of the lookup table.

In an agile WDM network, the use of offline network design tools that combine both optical propagation physics and traffic routing algorithms will be increasingly important for network planning. At higher (logical) network layers there is no need to worry about the physics of light when calculating paths across a network. At the optical (physical) layer, however, it is necessary to include an understanding of optical propagation when determining link attributes and status for optimal connectivity. Because of their interactive nature, physical propagation and optimization calculations are both processor and time intensive and are not suited to online real-time path calculations.

The offline path pre-computation function includes optimization algorithms and software implementations of those algorithms that identify optimal network element placement, perform offline service path pre-computation, and allow for a global optimization of restoration paths.

The main goal of the offline path pre-computation function is to recommend a set of validated optical paths to the distributed network elements to as to maintain an optimized network design. Using accurate network topology, traffic and resource status information derived from the control plane, optimized primary and restoration network paths can be calculated that deliver the specified QoS performance. A key requirement is to ensure that the necessary path diversity exists to meet the failure survivability criteria (e.g. single, double and triple simultaneous failure support) imposed on different services.

Additionally, due to the addition of new services or changes to existing service endpoints, a certain amount of traffic rerouting may be desirable to decrease network inefficiency (stranded capacity) induced by traffic churn. It is envisaged that re-optimization of network resources is a semi-static function that will occur at predetermined intervals or upon certain network thresholds being exceeded, and is based on traffic growth forecasts and current network status.

Key network metrics for use by the control plane path computation engine need to be defined to aid in its rapid set-up and restoration activities.

It has been proposed that automated validation testing of the offline simulation results be performed to confirm or validate that proposed lightpaths are indeed acceptable. Such an approach could take advantage of automated connection testing between test sets during off peak hours (perhaps associated with maintenance windows) using test/reference optical equipment. The theoretically calculated reach information generated by the offline design tool would then be validated against real network reach data and thus provide the carrier with confidence. During such validation testing, it is proposed that the carrier mark new circuits in a testing or maintenance mode, where the connection would be unavailable for live traffic. After validation, new circuits would be marked as available.

Figure 5:
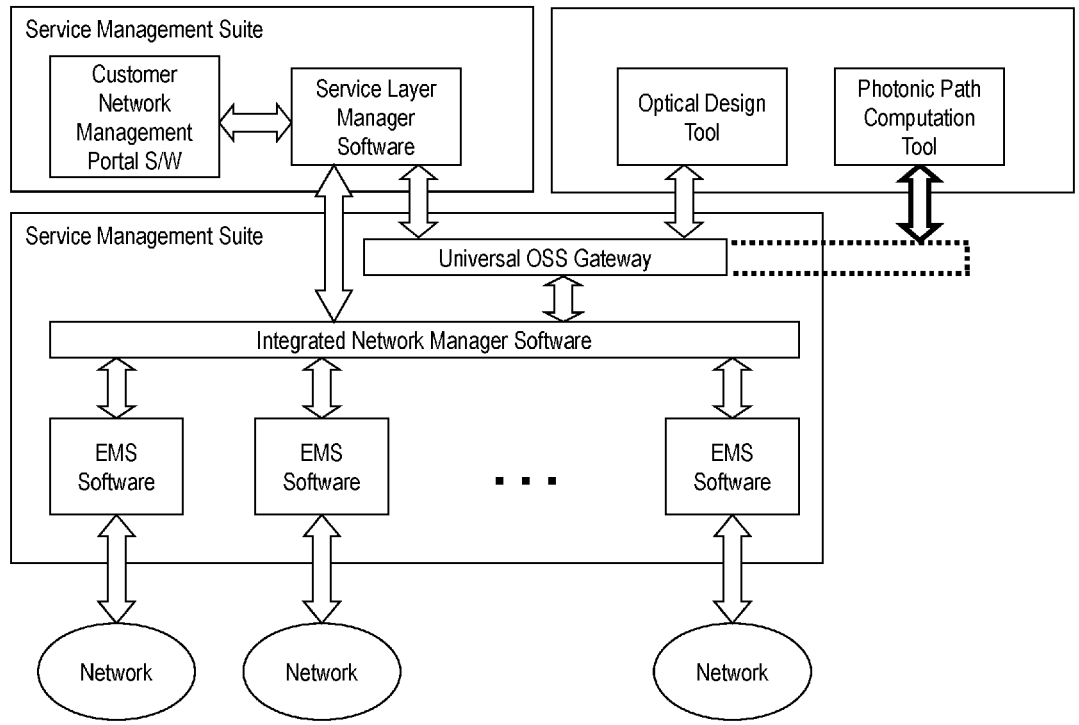
FIG. 5 is a schematic diagram and illustrates a network management system with a path pre-computation function according to an exemplary embodiment of the present invention.

Referring to FIG. 5, a network management system is illustrated with a path pre-computation function according to an exemplary embodiment of the present invention. Service path pre-computation and global restoration planning relies on data extracted directly from network elements to obtain an accurate and timely view of resource utilization. This task also develops requirements for the network element to network management system (NMS) interface to support service invocation and modification, as well as the transfer of relevant network utilization data from optical network layer to the offline capacity optimization application.

It is proposed that an optical path pre-computation function be developed as an extension to an Optical Design Tool. The new Photonic Path Computation Tool would interface to the network in the same manner as existing tools, such as via a Universal OSS Gateway. Thus, the present invention contemplates the feedback of real performance measurements (including coherent transponders) into the modeling tool, subsequent calculations of path viability and the distribution of a path-viability matrix in the NE's through a control plane.

Figure 6:
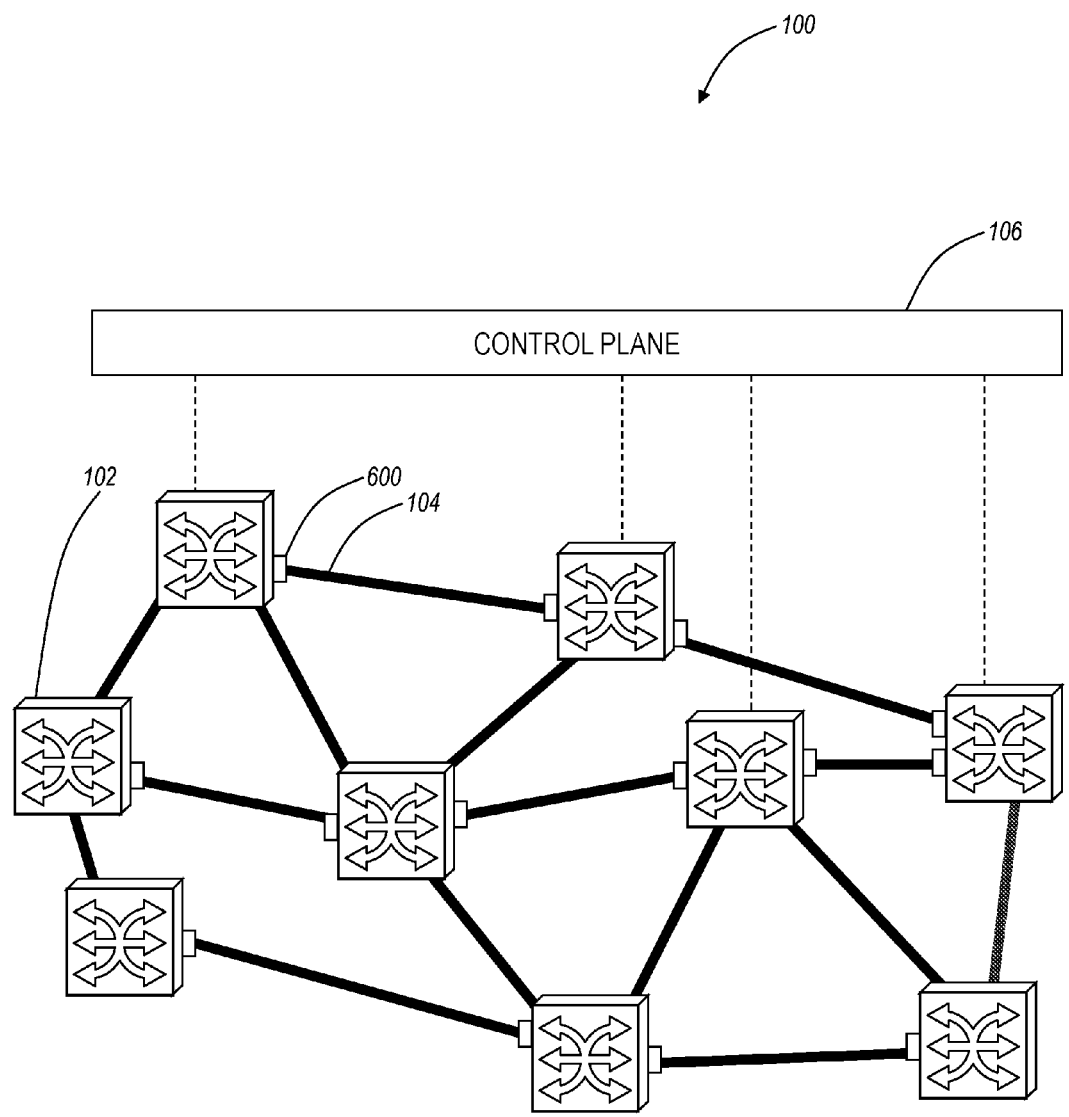
FIG. 6 is a schematic diagram and illustrates the optical network of FIG. 1 with a plurality of optical probes included at traffic origination/termination locations according to an exemplary embodiment of the present invention.

Referring to FIG. 6, the optical network 100 is illustrated with a plurality of optical probes 600 included at traffic origination/termination locations according to an exemplary embodiment of the present invention. The optical probes 600 are configured to obtain an accurate indication of the optical layer characteristics on each of the fiber links 104 and to provide these characteristics to the control plane 106. Each of the optical probes 600 includes a transmitter and a receiver. Further, the optical probes 600 can be positioned at all traffic origination/termination points or a subset thereof. The optical probes 600 validate path computation functionality in the control plane 106 by determining physical layer viability in addition to logical layer viability.

The optical probes 600 can include a Homodyne or an Intradyne Coherent receiver, with a digital post-processor. The Coherent receiver provides a direct measure of incident electrical field (not power) amplitude and phase. As such, full information on the linear, nonlinear and noise effects is fully preserved. An Analog-Digital converter digitizes the incoming analog signal, such that a digital signal processor can be applied to signal analysis. Homodyne implies that the carrier and the local oscillator (LO) are phase locked to each other. In Intradyne coherent receivers, the LO and carrier are not phase locked, but within a frequency offset which keeps the beat products of the information spectrum within the electrical bandwidth of the receiver. For example, operation can be with a frequency difference of up to 500 MHz. Also, coherent transponders are dual-polarization allowing the exploration of polarization simultaneously through the use of the orthogonal signals.

Since electric field is directly measured, the optical probes 600 provide a direct view into channel distortions. Analysis of DSP filter coefficients indicates the level of Polarization Dependent Loss (PDL), Polarization Mode Dispersion (PMD), Chromatic Dispersion and Filter Narrowing effects. More sophisticated processing signal processing, such as applying reverse Schrodinger propagation can be used to estimate intra-channel nonlinear effects, such as SPM.

Some impairments can be computed in real time on the incoming data, while others may require data storage and more sophisticated computational post-processing.

The same Coherent receiver can be applied to any of the existing channels, regardless of bit rate or modulation format, so long as channel is within the receiver bandwidth (to prevent aliasing issues). The optical probe 600 provides a simple optical pulse source, for example, selectable from 50 ps or 12 ps pulses. This probe can be coupled with an optical impairment monitor that is capable of differentiating ASE, CD, PMD, and SPM accumulation. Advantageously, the probe 600 is capable of a variety of measurements for different bit rates, modulation formats, etc. Note, typically, new transmitters come out frequently, e.g. 10 G chirped/unchirped, 10 G with/without EDC, 40 G duobinary/DPSK/DQPSK, 100 G, and the probe 600 is capable of providing measurements for all of these.

In order to probe newly commissioned paths that may not have representative channels loaded, the optical probe 600 provides a reduced complexity transmitter. The transmitter generates internal data, and can programmably modify its transmission properties, such as data rate and some format parameters. That is, the optical probe 600 includes a transmitter solely generating and transmitting first selectively variable test data to another optical probe 600 and a receiver receiving and processing second selectively variable test data from the another optical probe 600. In this manner, the optical probe 600 is distinguishable from conventional monitor circuits in receivers or the like that monitor in-service optical channels. The optical probe 600 is configured to measure unequipped light paths meaning there are no in-service channels at the wavelength over which the optical probe 600 is operating. This enables dynamic optical measurements prior to bringing optical channels in-service such as with the control plane.

Figure 7:
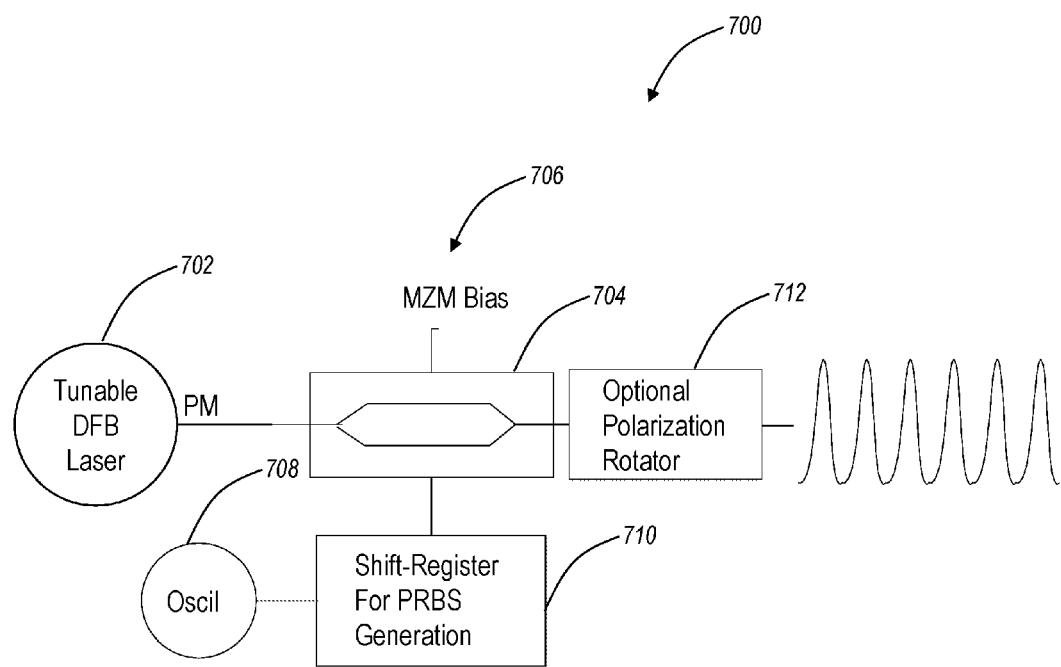
FIG. 7 is a schematic diagram and illustrates a dynamic probe transmitter for an optical probe according to an exemplary embodiment of the present invention.

Referring to FIG. 7, a dynamic probe transmitter 700 for the optical probe 600 is illustrated according to an exemplary embodiment of the present invention. The dynamic probe transmitter 700 includes a transmitter 702, such as a tunable distributed feedback (DFB) laser, followed by a Mach-Zehnder modulator (MZM) 704. The modulator 704 can have adjustable rate modulation input, and adjustable biasing 706, which can produce a rich variety of pulse train properties with a low-complexity hardware configuration. For example, the adjustable biasing 706 can be tuned to Null, Quadrature, or Peak bias, producing 67%, 50%, and 33% pulses respectfully, with either Carrier or Carrier-Suppressed configurations.

The modulator 704 may be driven by a simple oscillator 708, although this reduces the frequency content of the generated signal. The oscillator 708 can be rate selectable to provide various different bit rates, e.g. 10 G, 22 G, 28 G, 40 G, 100 G, etc. Additionally, the transmitter 700 could use shift registers 710 or some other means to generate a PRBS sequence, which may be of relatively short length. This provides more spectrally dense signal frequency content, depending on the PRBS sequence length.

The laser 702 can be tunable to provide access to all possible wavelength slots in the system. Further, an optional polarization rotator 712 may be added to provide access to additional polarization-dependent information, such as PDG, PDL and PMD, within a much shorter time frame than would be available from natural system fluctuations.

It should be noted that other configurations of the transmitter 700 are also contemplated by the present invention. For example, a directly modulated laser can be used to further reduce the cost and complexity, but at the expense of variety of selectable pulse properties.

Figure 8:
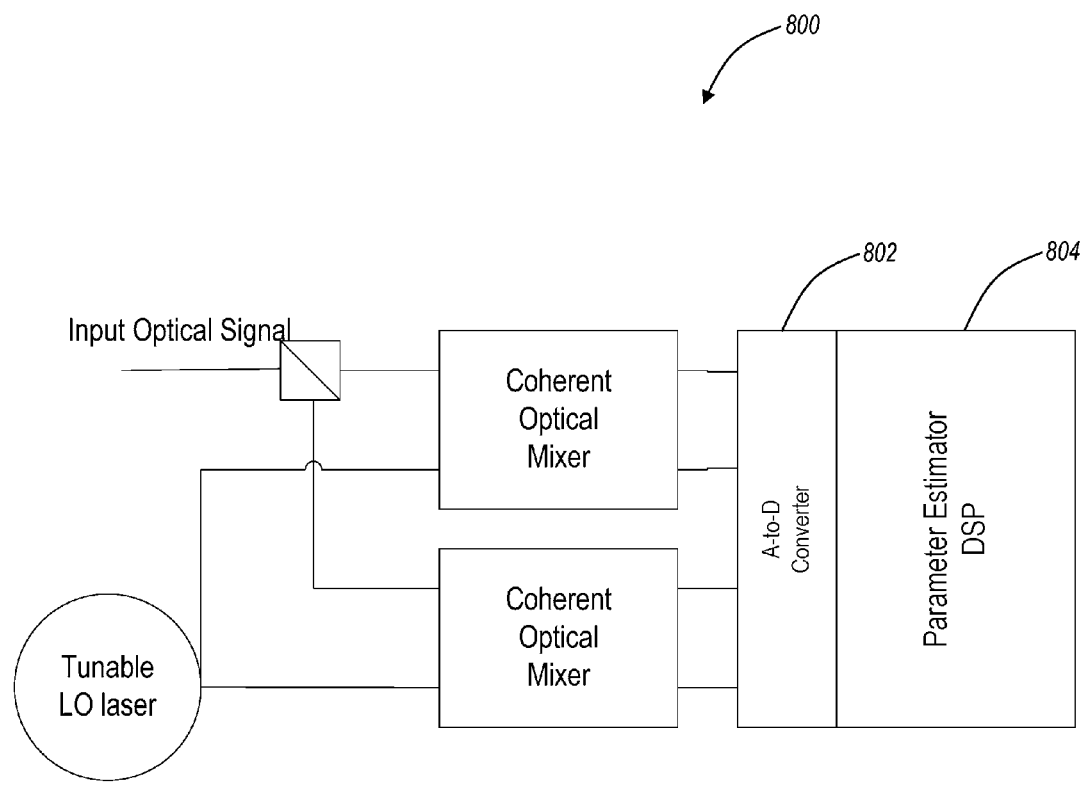
FIG. 8 is a schematic diagram and illustrates a dynamic probe receiver for an optical probe according to an exemplary embodiment of the present invention.

Referring to FIG. 8, a dynamic probe receiver 800 for the optical probe 600 is illustrated according to an exemplary embodiment of the present invention. The receiver 800 is implemented as a Coherent, Digitally-Sampled configuration through an A-to-D converter 802, with back-end DSP processing 804. The DSP 804 can include dynamically adaptive filters that may be synchronized with the specific data rate being transmitted by the probe.

A further improvement may be to include additional data path and electronic circuitry to provide improved common-mode signal rejection. In this way, a coherent receiver can operate without an optical pre-filter, and can be tuned to any channel in the system purely through LO frequency selection, and subsequent DSP processing.

It should also be noted that the same Coherent receiver can be used to probe existing data carrying channels, and may be used to estimate real live traffic performance characteristics along the transmission path. Further, same arrangement may be used to provide eavesdropping capability. Here, the Coherent receiver can receive a split signal from an existing data carrying channel without use of the transmitter on the optical probe 600.

Various mechanisms exist for estimating some optical propagation characteristics, such as residual Chromatic Dispersion, Instantaneous PMD impairment, and Optical Signal Noise Ratio. For example, some mechanisms are described in Hauske et al., "Optical Performance Monitoring from FIR Filter Coefficients in Coherent Receivers," OFCNFOEC 2008, Optical Society of America, 2008; Hauske et al., "DGD Estimation from FIR Filter Taps in Presence of Higher Order PMD," ECOC 2008, September 2008; and Yi et al., "Experimental Demonstration of Optical Performance Monitoring in Coherent Optical OFDM Systems," OFC/NFOEC 2008, Optical Society of America, 2008, the contents of each are herein incorporated by reference.

Another approach to estimate OSNR may be to use the fact that ASE noise accumulates on both polarizations, while the probe signal is transmitted on only one.

Optical filter (as for example, caused by in-line ROADMs) bandwidth narrowing can be probed via investigating the dependence of pulse shape on transmitted bit rate.

Other parameters, such as Self Phase Modulation may be estimated by looking at the relationship of optical phase deviation from nominal as a function of optical pulse power and optical pulse rate/duration. Amount of SPM is proportional to the derivative of power relative to time (i.e. higher-power and shorter pulses accumulate more SPM).

Another mechanism for estimating SPM could be to apply reverse Schrodinger propagation and optimize on the best received signal by estimating the unwrapping of generated nonlinear phase shift.

Cross-Phase modulation is more difficult to estimate. Though some possibilities may include subtracting out polarization-dependent OSNR estimates, and looking at residual noise. For example, ASE noise depends on 'Probe' signal power, and would decrease as Probe power is increased. However, XPM noise is independent of Probe power, and depends only on near neighbors. Thus, mapping out noise dependence on Probe channel power can allow ASE and XPM separation.

The proposed invention provides an accurate estimation for optical channel performance characteristics, based either on existing channels or on an additional dynamic optical probe. It provides an ability to obtain all critical parameters, such as:

1. More accurate OSNR measurement
2. Estimation for residual Chromatic Dispersion
3. Estimation for Polarization Dependent Loss
4. Estimation for Polarization Mode Dispersion
5. Estimation for inter-channel nonlinear effects, such as XPM and FWM
6. Estimation for intra-channel nonlinear effects, such as SPM, iXPM, iFWM
7. Estimation for possible bandwidth narrowing due to in-line OADM filters These advantages can be traded for a significant enhancement in the performance and efficiency of deployed optical networks. Improved network performance can be translated into a combination of higher operational reliability and lower capital costs.

1. Network bandwidth can be allocated in a more efficient manner, with traffic routed over links with inherently better performance and higher capacity
2. Total link capacity can be fine-tuned on the installed system to recover inherent margin associated with deployment uncertainties and aging.
3. Individual channels can be optimized, accounting for actual deployed hardware characteristics.

As DSPs, ADCs and DACs become smaller, more power efficient and less expensive, they can be used for lower bit-rate transmission to make transponders much simpler to yield and higher performance. This same thing has happened in radio technology, i.e. no one would consider a direct detection radio even for the simplest, most cost challenged of applications. Also, it is the expectation that low cost coherent systems will not be limited by digital bandwidth such that one can consider much more complex schemes in the future at essentially the same cost. For example, one can consider using heterodyne detection. If one is not challenged by the digital performance, then one could consider oversampling the heterodyne intermediate frequency (IF) and then provide adaptive digital filtering. For instance, in an optical service channel (OSC) application, 1.55 Mbps can be sent through a transponder with a 5 Gsample/s capability and a matching 5 GHz electrical bandwidth. The digital system could then do the filtering down to the ~1.5 MHz receiver bandwidth thereby retaining tunability, noise performance and sensitivity. The limit in this case would be the common mode rejection ratio (CMRR) which can be quite good. Today, one can easily achieve 50 dB with parts from a specific vendor (although the CMRR degrades with increasing IF which could limit the offset to <5 GHz—though this could be improved in the future and potentially even calibrated over frequency, self-calibration also is a possibility). One could also be able to tune and track the carrier to explore the phase response of the channel—indeed the possibilities are endless.

Figure 9:
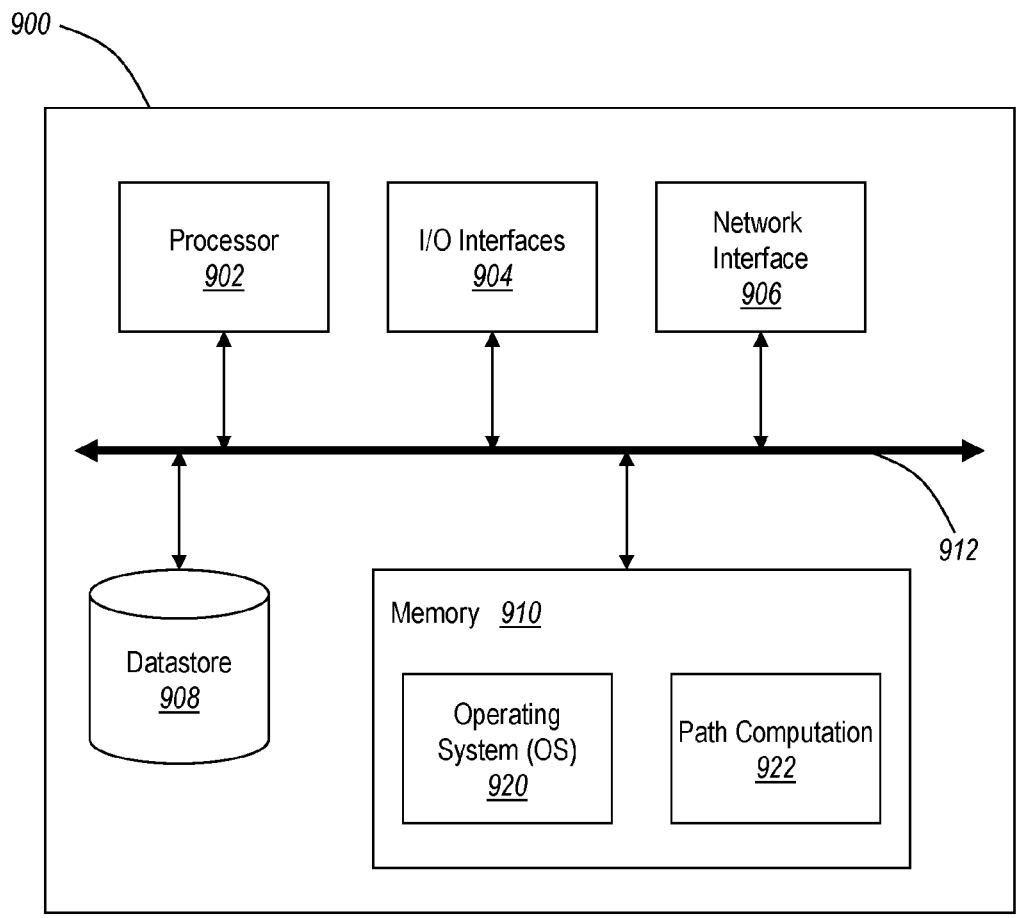
FIG. 9 is a schematic diagram and illustrates a block diagram of a server configured to, responsive to computer-executable code, perform an optical path computation function according to an exemplary embodiment of the present invention.

Referring to FIG. 9, a block diagram illustrates a server 900 configured to, responsive to computer-executable code, perform an optical path computation function according to an exemplary embodiment of the present invention. The server 900 can be a digital computer that, in terms of hardware architecture, generally includes a processor 902, input/output (I/O) interfaces 904, network interfaces 906, a data store 908, and memory 910. The components (902, 904, 906, 908, and 910) are communicatively coupled via a local interface 912. The local interface 912 can be, for example but not limited to, one or more buses or other wired or wireless connections, as is known in the art. The local interface 912 can have additional elements, which are omitted for simplicity, such as controllers, buffers (caches), drivers, repeaters, and receivers, among many others, to enable communications. Further, the local interface 912 can include address, control, and/or data connections to enable appropriate communications among the aforementioned components.

The processor 902 is a hardware device for executing software instructions. The processor 902 can be any custom made or commercially available processor, a central processing unit (CPU), an auxiliary processor among several processors associated with the server 900, a semiconductor-based microprocessor (in the form of a microchip or chip set), or generally any device for executing software instructions. When the server 900 is in operation, the processor 902 is configured to execute software stored within the memory 910, to communicate data to and from the memory 910, and to generally control operations of the server 900 pursuant to the software instructions.

The I/O interfaces 904 can be used to receive user input from and/or for providing system output to one or more devices or components. User input can be provided via, for example, a keyboard and/or a mouse. System output can be provided via a display device and a printer (not shown). I/O interfaces 904 can include, for example, a serial port, a parallel port, a small computer system interface (SCSI), an infrared (IR) interface, a radio frequency (RF) interface, and/or a universal serial bus (USB) interface.

The network interfaces 906 can be used to enable the server 900 to communicate on a network. The network interfaces 906 can include, for example, an Ethernet card (e.g., 10BaseT, Fast Ethernet, Gigabit Ethernet) or a wireless local area network (WLAN) card (e.g., 802.11a/b/g/n). The network interfaces 906 can include address, control, and/or data connections to enable appropriate communications on the network. A user can log on and communicate with the server 900 remotely through the network interfaces 906. In the present invention, the network interfaces 906 can be configured to communicate to various nodes and optical probes to retrieve physical layer attributes used in a path computation.

A data store 908 can be used to store data, such as fitness data, MD data, etc. The data store 908 can include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof Moreover, the data store 908 can incorporate electronic, magnetic, optical, and/or other types of storage media. In one example, the data store 908 can be located internal to the server 900 such as, for example, an internal hard drive connected to the local interface 912 in the server 900.

The memory 910 can include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof Moreover, the memory 910 may incorporate electronic, magnetic, optical, and/or other types of storage media. Note that the memory 910 can have a distributed architecture, where various components are situated remotely from one another, but can be accessed by the processor 902.

The software in memory 910 can include one or more software programs, each of which includes an ordered listing of executable instructions for implementing logical functions. In the example of FIG. 9, the software in the memory 910 includes a suitable operating system (O/S) 920 and a path computation 922 program. The operating system 920 essentially controls the execution of other computer programs, such as the path computation 922 program, and provides scheduling, input-output control, file and data management, memory management, and communication control and related services. The operating system 920 can be any of Windows NT, Windows 2000, Windows XP, Windows Vista (all available from Microsoft, Corp. of Redmond, Wash.), Solaris (available from Sun Microsystems, Inc. of Palo Alto, Calif.), LINUX (or another UNIX variant) (available from Red Hat of Raleigh, N.C.), or the like.

Figure 10:
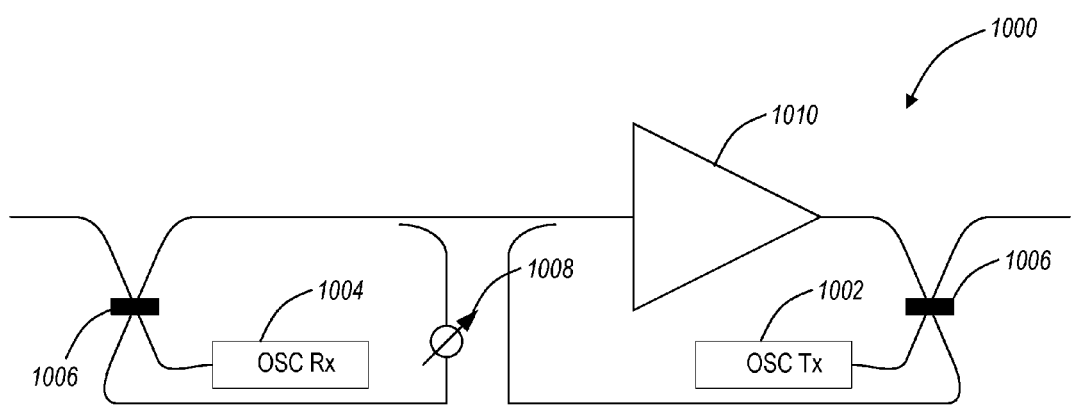
FIG. 10 is a schematic diagram and illustrates a coherent OSC system according to an exemplary embodiment of the present invention.
Figure 11:
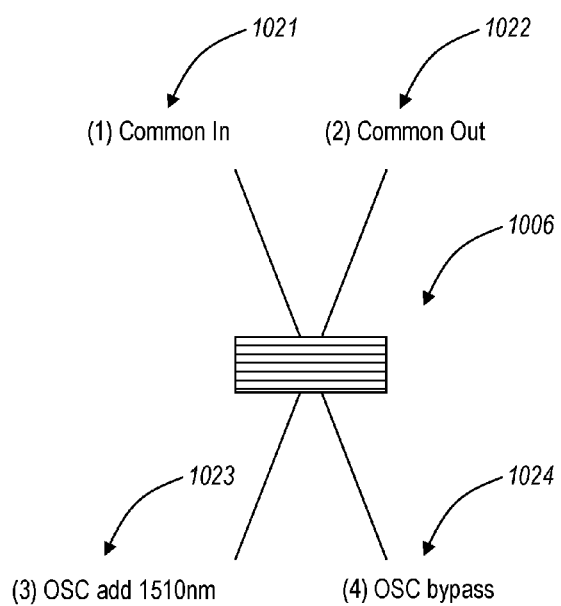
FIG. 11 is a schematic diagram and illustrates a four-port coupler for the coherent OSC system of FIG. 10 according to an exemplary embodiment of the present invention.

Referring to FIGS. 10 and 11, a coherent OSC system 1000 is illustrated according to an exemplary embodiment of the present invention. The coherent OSC system 1000 is specifically designed for a low bit rate commensurate with OSC applications, and employs a modulation format which is very robust, for example 1 Gbps dual-polarization binary phase-shift keying (DP-BPSK). FIG. 10 is a functional schematic diagram showing various components of the coherent OSC system 1000 such as an OSC Tx 1002, an OSC Rx 1004, four-port couplers 1006, and an optional variable optical attenuator (VOA) or shutter 1008. The four-port couplers 1006 are illustrated in additional detail in FIG. 11. The coherent OSC system 1000 can be package and a module with the various components 1002, 1004, 1006, 1008 contained therein. The OSC Tx 1002 can employ a fixed laser, or tunable where tunability enables more features. The coherent OSC system 1000 can also include a DSP capable of measuring various parameters, many of which are statistical in nature, which characterize the channel over which the OSC has propagated, similar to the optical probe 600. This DSP may be a part of the DSP which enables the coherent detection, or it may be a separate block. The coherent OSC system 1000 is used in an optical network to automatically detect Propagation Distance, PMD, PDL, CD, OSNR, Rx Power, and the like similar to the optical probe 600. With a tunable laser variant, this can be swept across available wavelength positions.

The four-port coupler 1006 coupled to the OSC Tx 1002 is configured to inject the OSC wavelength onto the transmission fiber and the four-port coupler 1006 at the end of the transmission fiber coupled to the OSC Rx 1004 removes a portion of the light travelling on the fiber and directs it to the OSC Rx 1004 for processing. For example, the coherent OSC system 1000 can be duplicated and used with a pair of transmission fibers arranged to provide a bidirectional link for communications between nodes. It is possible for the transmission fibers to carry two directions of data-bearing traffic channels and for the OSC channel to travel in the same direction (co-propagating) as these channels, or in the opposite direction (counter-propagating) from the data channels. Another exemplary embodiment could use a single fiber working solution, where two different wavelengths are used by the OSC to provide a bidirectional link on the single working fiber. Additionally, the OSC system 1000 can include an amplifier 1010 between the four-port couplers 1006 and the OSC Rx 1004 and the OSC Tx 1002.

The four-port coupler 1006 can include four ports 1021, 1022, 1023, 1024. The port 1021 is a common in port, the port 1022 is a common out port, the port 1023 is an OSC add port and the port 1024 is an OSC bypass port. For example, assume the OSC wavelength is 1510 nm (note: any wavelength is contemplated herein), the four-port coupler 1006 can be a dielectric filter where 1510 nm is passed from the port 1023 to the port 1022 and from the port 1021 to the port 1024. The OSC Tx 1002 contemplate a tunable wavelength such as 1500 to 1600 nm or the like. When the OSC wavelength is tuned to 1510 nm, it is transmitted by the four-port coupler 1006 to the common out port 1022, and when it is tuned to any other wavelength than 1510 nm, it is reflected to the OSC bypass port 1024. In this manner, the OSC system 1000 can be used as both an OSC (e.g., at 1510 nm) and as a probe (e.g., at any traffic carrying wavelength). The inherent isolation of the dielectric filter (e.g., ~70 dB) is exploited to prevent multi-phase interference (MPI) for the amplification band of an erbium doped fiber amplifier (EDFA) such as the amplifier 1010.

Also, for the OSC wavelength at 1510 nm, interference is avoided since this wavelength is outside the amplification band of an EDFA. The input port 1023 can include the VOA or shutter 1008 to allow the OSC Rx 1004 to see only the OSC wavelength (e.g., 1510 nm) when high sensitivity is required. When operating in-band, the OSC Tx 1002 is bypassed to the input of the amplifier 1010 where it experiences gain. The downstream OSC Rx 1004 then sees the in-band OSC wavelength from any upstream insertion point (note, only one such insertion point at a given wavelength is allowable since it will propagate downstream). The optical signal from the in-band OSC wavelength will include ASE and the like from all upstream amplifiers, allowing measurements of the cumulative noise and other parameters of interest on the path.

Similar to the optical probe 600, using a coherent OSC with a high common-mode rejection ratio (CMRR) for the OSC Tx 1002, it is possible to inject this channel into an unused portion of the transmission band where it can propagate in the same part of the spectrum as the data bearing channels. Therefore, the four-port coupler 1006 to the transmission fiber can include a broad-band tap, a specific wavelength filter (either in-band or out-of-band), or a tunable filter which may be attached to a tap or of a 3-port variety, for example a wavelength selective switch. Accordingly, the OSC system 1000 could have a feature called Probe Mode. In Probe Mode, the OSC coherent Rx 1004 is used to measure the statistics of the phase noise. Using a tunable transponder for the OSC Tx 1002 and the four-port coupler 1006 which allows the adjustment of the wavelength in use, the OSC system 1000 can be adjusted to a portion of the spectrum which is unused and which propagates through the amplifiers 1010. This can happen in service if it is coordinated between sites giving the ability for multiple OSC Rx 1004 to detect the same signal as it propagates through the line. The injection point for this channel can also be coordinated. Phase noise statistics can be extracted and accurate conclusions can be made on XPM and OSNR. By adjusting with powers, understanding OSNR for a given launch power, and perhaps applying special modulation on the probe tone, SPM can be estimated. In normal operation, the OSC system 1000 can be adjusted to an out-of-band wavelength carrying data between sites. Also, the service channel could be supported on very challenging optical networks, for example ultra long haul systems and submarine systems, since the OSC system 1000 includes a robust modulation format and low bit-rate.

Advantageously, with a coherent service channel in a network, it can be used to auto-detect link budgets and suggest the correct modem for support (i.e. no simulations required—real plug and play). It can estimate maximum capacity. It can also be used to monitor line conditions, and historical latency and distance performance monitoring (PMs) data can be added to the service channel capabilities (i.e. no more field trials and test sets for latency measurements). Since the OSC system 1000 works on a span-by-span basis, it allows location of these effects to the specific fiber of interest. In another exemplary embodiment, an application to Submarine links, or on 3rd party lines, the OSC system 1000 can takes the form of a card which can be injected and removed for detection on a link-by-link basis. In these applications, the OSC system 1000 and the probe 600 allows the measurement of information and location of potential issues directly through the line system even with the lack of detailed knowledge of the design and operation of the system in question.

Some portions of the aforementioned detailed descriptions are presented in terms of procedures, logic blocks, processing, steps, and other symbolic representations of operations on data bits within a computer memory. These descriptions and representations are the means used by those skilled in the data processing arts to most effectively convey the substance of their work to others skilled in the art. A procedure, logic block, process, etc., is generally conceived to be a self-consistent sequence of steps or instructions leading to a desired result. The steps require physical manipulations of physical quantities. Usually, though not necessarily, these quantities take the form of electrical or magnetic signals capable of being stored, transferred, combined, compared and otherwise manipulated in a computer system. It has proven convenient at times, principally for reasons of common usage, to refer to these signals as bits, bytes, words, values, elements, symbols, characters, terms, numbers, or the like.

It should be born in mind that all of the above and similar terms are to be associated with the appropriate physical quantities they represent and are merely convenient labels applied to these quantities. Unless specifically stated otherwise as apparent from the following discussions, it is appreciated that throughout the present invention, discussions utilizing terms such as 'processing,' 'computing,' 'calculating,' 'determining,' 'displaying' or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The invention can take the form of an entirely hardware embodiment, an entirely software embodiment or an embodiment containing a combination of hardware and software elements. In one embodiment, a portion of the mechanism of the invention is implemented in software, which includes but is not limited to firmware, resident software, object code, assembly code, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium is any apparatus that can contain, store, communicate, propagate, or transport the program for use by or in connection with the instruction execution system, apparatus, or device, e.g., floppy disks, removable hard drives, computer files comprising source code or object code, flash semiconductor memory (USB flash drives, etc.), ROM, EPROM, or other semiconductor memory devices.

Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention, are contemplated thereby, and are intended to be covered by the following claims.

What is claimed is:

1. A method for path computation based on dynamic performance monitoring in an optical network, the method comprising:
   obtaining dynamic performance monitoring data related to optical layer characteristics in the optical network;
   performing an offline computation to generate a decision engine for determining physical validity of paths in the optical network based on the dynamic performance monitoring data, wherein the decision engine provides valid and reachable destinations from each source network element; and
   disseminating the decision engine to network elements in the optical network for use in path computation at runtime.

2. The method of claim 1, further comprising:
   periodically repeating the obtaining, the performing, and the disseminating.

3. The method of claim 1, wherein the decision engine is utilized in the path computation by a network element computing a path at runtime to determine physical validity of the path in addition to logical validity of the path.

4. The method of claim 1, wherein the decision engine is one of a finite state machine, a rule-based database, and as a time-varying set of matrix constructs.

5. The method of claim 1, further comprising:
   computing offline a plurality of top candidate optical paths from each node to each other node based on a current snapshot of network resource usage; and
   disseminating the plurality of top candidate paths to each of the network elements.

6. The method of claim 1, wherein the dynamic performance monitoring data comprises feedback from real optical performance measurements in the optical network, and wherein the offline computation utilizes the real optical performance measurements in modeling and calculations to ensure optical path viability.

7. The method of claim 6, wherein the real optical performance measurements are obtained from any of coherent transceivers, coherent probes, and coherent Optical Service Channels (OSCs).

8. The method of claim 1, wherein the obtaining, the performing, and the disseminating is performed by a centralized server and the network elements operate a control plane with an individual network element utilizing the decision engine in path computation via the control plane.

9. A server adapted to perform path computation based on dynamic performance monitoring in an optical network, the server comprising:
   a network interface and a processor communicatively coupled to one another; and
   memory storing instructions that, when executed, cause the processor to obtain via the network interface dynamic performance monitoring data related to optical layer characteristics in the optical network, perform an offline computation to generate a decision engine for determining physical validity of paths in the optical network based on the dynamic performance monitoring data, wherein the decision engine provides valid and reachable destinations from each source network element, and disseminate via the network interface the decision engine to network elements in the optical network for use in path computation at runtime.

10. The server of claim 9, wherein the memory storing instructions that, when executed, further cause the processor to periodically repeat the obtain, the perform, and the disseminate.

11. The server of claim 9, wherein the decision engine is utilized in the path computation by a network element computing a path at runtime to determine physical validity of the path in addition to logical validity of the path.

12. The server of claim 9, wherein the decision engine is one of a finite state machine, a rule-based database, and as a time-varying set of matrix constructs.

13. The server of claim 9, wherein the memory storing instructions that, when executed, further cause the processor to compute offline a plurality of top candidate optical paths from each node to each other node based on a current snapshot of network resource usage; and disseminate the plurality of top candidate paths to each of the network elements.

14. The server of claim 9, wherein the dynamic performance monitoring data comprises feedback from real optical performance measurements in the optical network, and wherein the offline computation utilizes the real optical performance measurements in modeling and calculations to ensure optical path viability.

15. The server of claim 14, wherein the real optical performance measurements are obtained from any of coherent transceivers, coherent probes, and coherent Optical Service Channels (OSCs).

16. The server of claim 9, wherein the network elements operate a control plane with an individual network element utilizing the decision engine in path computation via the control plane.

17. Software stored in one of volatile and non-volatile memory comprising instructions that, when executed, cause a processor to perform steps of:

obtaining dynamic performance monitoring data related to optical layer characteristics in the optical network;

performing an offline computation to generate a decision engine for determining physical validity of paths in the optical network based on the dynamic performance monitoring data, wherein the decision engine provides valid and reachable destinations from each source network element; and disseminating the decision engine to network elements in the optical network for use in path computation at runtime.

18. The software stored in one of volatile and non-volatile memory of claim 17, wherein the instructions that, when executed, further cause a processor to perform steps of:

periodically repeating the obtaining, the performing, and the disseminating.

19. The software stored in one of volatile and non-volatile memory of claim 17, wherein the decision engine is utilized in the path computation by a network element computing a path at runtime to determine physical validity of the path in addition to logical validity of the path.

20. The software stored in one of volatile and non-volatile memory of claim 17, wherein the decision engine is one of a finite state machine, a rule-based database, and as a time-varying set of matrix constructs.

* * * * *